No. 876,756. PATENTED JAN. 14, 1908.
H. WETTIG.
MALT KILN.
APPLICATION FILED SEPT. 23, 1907.

UNITED STATES PATENT OFFICE.

HEINRICH WETTIG, OF ERFURT, GERMANY, ASSIGNOR TO THE FIRM OF J. A. TOPF AND SOEHNE, OF ERFURT, GERMANY.

MALT-KILN.

No. 876,756.  Specification of Letters Patent.  Patented Jan. 14, 1908.

Application filed September 23, 1907. Serial No. 394,124.

*To all whom it may concern:*

Be it known that I, HEINRICH WETTIG, a citizen of the German Empire, residing at Erfurt, in the Kingdom of Prussia, Empire of Germany, have invented certain new and useful Improvements in Malt-Kilns, of which the following is a description, reference being had to the accompanying drawing, and to the letters and figures of reference marked thereon.

Kilns with different stages or floors are usually employed for making malt and these are generally the so-called two-stage kilns. Three-stage kilns have not hitherto been satisfactorily employed, because the advantages thereby obtained are counteracted by the drawbacks inherent in the separate systems.

The best construction of a three-stage kiln is one in which the lowest tier or stage may be entirely shut off from the draft, and the latter allowed to act entirely on the two upper stages or tiers. In order to attain this result, passages are arranged in the walls which allow the air necessary for drying the malt to flow from the furnace, round the lower stage and pass directly beneath the middle stage or tier. The result of this is that the two upper stages operate like a two-stage kiln, while the third stage allows of a suitably increased production with a small consumption of fuel. In these three-stage kilns however the air distribution is unsatisfactory. Now stage kilns have already been known in which a separate air distributing chamber is provided between the stages.

The object of the present invention forms a three-stage kiln with lateral circulation passages and an air distributing chamber which, as compared with the known constructions, has the special advantage that the air is uniformly distributed over the entire area of the tiers or stages, and this is obtained by dividing the air distributing chamber into separate compartments.

Figure 1:
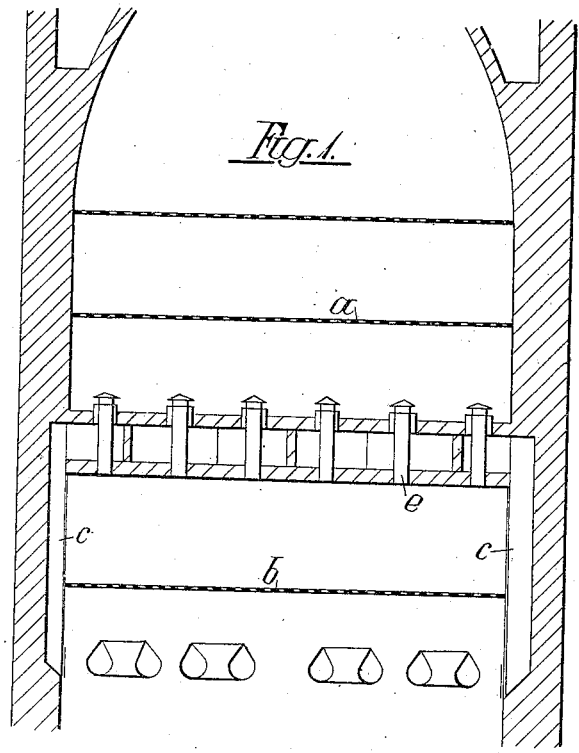
Figure 2:
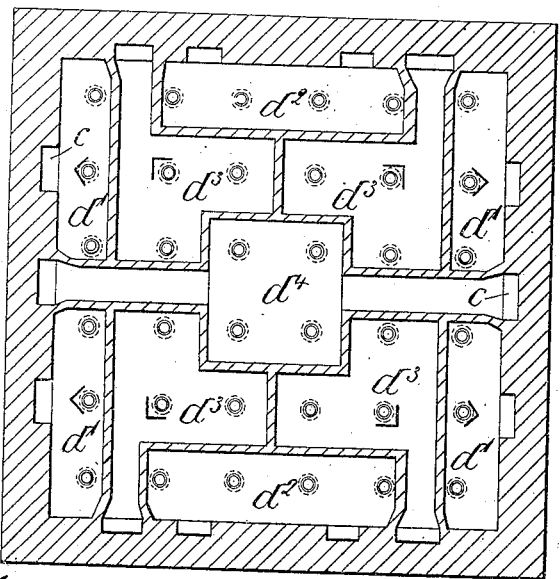

The invention is shown in the accompanying drawings in which:—Figure 1 is a longitudinal section; and Fig. 2, a plan view of the intermediate chamber.

The bottom stage or floor is indicated by $b$ and the middle stage by $a$. The air distributing chamber is divided into several separate compartments $d'$, $d^2$, $d^3$, $d^4$, and so on, each of which is in communication with one or more of the lateral air passages $c$ the sections of the passages being varied according to the number of the nozzles $e$ which are to be fed. In this manner even with a restricted air circulation the air of the separate channels or passages is always forced to discharge to each chamber, in order here to emerge distributed over the area, so that under all circumstances a perfectly uniform aeration takes place, such as is indispensable for a good malt.

I declare that what I claim is:—

In a three stage kiln, having lateral circulation passages, an air distributing chamber located between two of the stages said air distributing chamber being divided into separate compartments, each of said compartments being in communication with one or more of the lateral circulation passages, substantially as described.

In testimony whereof I affix my signature, in presence of two witnesses.

HEINRICH WETTIG.

Witnesses:
 WILHELM VOGES,
 ALBIN KLINGLER.